US010874974B2

(12) United States Patent
Joss et al.

(10) Patent No.: US 10,874,974 B2
(45) Date of Patent: Dec. 29, 2020

(54) TEMPERATURE-SWING ADSORPTION PROCESS

(71) Applicant: Casale SA, Lugano (CH)

(72) Inventors: Lisa Joss, Manchester (GB); Matteo Gazzani, Zurich (CH); Marco Mazzotti, Zurich (CH)

(73) Assignee: Casale SA, Lugano (CH)

( * ) Notice: Subject to any disclaimer, the term of this patent is extended or adjusted under 35 U.S.C. 154(b) by 173 days.

(21) Appl. No.: 16/074,538

(22) PCT Filed: Mar. 7, 2017

(86) PCT No.: PCT/EP2017/055285
§ 371 (c)(1),
(2) Date: Aug. 1, 2018

(87) PCT Pub. No.: WO2017/153385
PCT Pub. Date: Sep. 14, 2017

(65) Prior Publication Data
US 2019/0030479 A1 Jan. 31, 2019

(30) Foreign Application Priority Data

Mar. 8, 2016 (EP) .................................... 16159248
May 25, 2016 (EP) .................................... 16171370

(51) Int. Cl.
*B01D 53/04* (2006.01)
(52) U.S. Cl.
CPC .... *B01D 53/0462* (2013.01); *B01D 2253/102* (2013.01); *B01D 2253/104* (2013.01);
(Continued)

(58) Field of Classification Search
CPC .......... B01D 53/0462; B01D 2253/102; B01D 2253/104; B01D 2253/106;
(Continued)

(56) References Cited

U.S. PATENT DOCUMENTS 5,298,054 A * 3/1994 Malik ................... B01D 53/04
95/104
6,592,836 B2 7/2003 Hufton et al.
(Continued)

FOREIGN PATENT DOCUMENTS

| CN | 101260330 A | 9/2008 |
|---|---|---|
| CN | 101530718 A | 9/2009 |

(Continued)

OTHER PUBLICATIONS

International Search Report issued in connection with PCT/EP2017/055285.

(Continued)

*Primary Examiner* — Frank M Lawrence, Jr.
(74) *Attorney, Agent, or Firm* — Akerman LLP

(57) ABSTRACT

A temperature swing adsorption (TSA) process for removing a target component from a gaseous mixture, where the process is carried out in a plurality of reactors. Each reactor performs the following steps: an adsorption step wherein an input stream of said gaseous mixture is contacted with a solid adsorbent selective for said target component, producing a first waste stream depleted of the target component; a heating step for regeneration of the loaded adsorbent providing a first output stream containing the target component; and a cooling step of the regenerated adsorbent.

23 Claims, 8 Drawing Sheets

(52) U.S. Cl.
CPC .. *B01D 2253/106* (2013.01); *B01D 2253/108* (2013.01); *B01D 2253/204* (2013.01); *B01D 2256/10* (2013.01); *B01D 2257/504* (2013.01); *B01D 2257/80* (2013.01); *B01D 2259/403* (2013.01); *B01D 2259/40045* (2013.01); *B01D 2259/40052* (2013.01); *B01D 2259/40064* (2013.01); *Y02C 20/40* (2020.08)

(58) Field of Classification Search
CPC ........ B01D 2253/108; B01D 2253/204; B01D 2256/10; B01D 2257/504; B01D 2257/80; B01D 2259/40045; B01D 2259/40052; B01D 2259/40064; B01D 2259/403; Y02C 10/08
USPC ..... 95/114, 115, 117, 139; 96/121, 126, 146
See application file for complete search history.

(56) References Cited

U.S. PATENT DOCUMENTS

| | | | |
|---|---|---|---|
| 7,022,159 B2 | 4/2006 | Kalbassi et al. | |
| 8,557,029 B2 | 10/2013 | Force et al. | |
| 8,673,062 B2 | 3/2014 | Menzel | |
| 8,778,050 B2 * | 7/2014 | Dolan | C10L 3/101 95/96 |
| 2003/0037672 A1 * | 2/2003 | Sircar | B01D 53/0462 95/96 |
| 2008/0289497 A1 | 11/2008 | Barclay et al. | |
| 2010/0224565 A1 | 9/2010 | Dunne et al. | |
| 2011/0017061 A1 | 1/2011 | Carlsson | |
| 2014/0026750 A1 | 1/2014 | Jain | |
| 2014/0326136 A1 | 11/2014 | Doong et al. | |
| 2019/0046919 A1 | 2/2019 | Liu et al. | |
| 2019/0083919 A1 * | 3/2019 | Gazzani | B01D 53/0462 |

FOREIGN PATENT DOCUMENTS

| | | |
|---|---|---|
| EP | 0503049 B1 | 6/1996 |
| RU | 2363523 C2 | 8/2009 |
| WO | 2007006490 A1 | 1/2007 |
| WO | 2013135398 A1 | 9/2013 |
| WO | 2015/117738 A1 | 8/2015 |

OTHER PUBLICATIONS

International Preliminary Report on Patentability issued in connection with PCT/EP2017/055285.

* cited by examiner

FIG. 10 --Prior Art--

TEMPERATURE-SWING ADSORPTION PROCESS

This application is a national phase of PCT/EP2017/055285, filed Mar. 7, 2017, and claims priority to EP 16159248.0, filed Mar. 8, 2016, and EP 16171370.6, filed May 25, 2016, the entire contents of all of which are hereby incorporated by reference.

FIELD OF THE INVENTION

The present invention relates to a process for separating a target component from a gaseous mixture also containing one or more side components, for example for separating carbon dioxide from a flue gas also containing nitrogen. In particular, the present invention relates to a process involving temperature-swing adsorption of said target component on a solid adsorbent.

PRIOR ART

The separation of a target component contained in a gaseous mixture is of notable importance in several fields, e.g. chemicals, fuels, food, power production. It can be desirable for environmental concerns and/or for use of such target component as raw material in an industrial process.

The separation of a target component from a gaseous mixture (e.g. carbon dioxide from a flue gas) can be performed via chemical scrubbing, wherein the gaseous mixture is contacted with a liquid solution containing a compound suitable for selectively removing said target component. Said process requires an absorber wherein the solution selectively absorbs the target component and a desorber wherein the solution is regenerated by supplying thermal energy. However, chemical scrubbing has the drawback of requiring a solution which is generally toxic, harmful and subjected to degradation. When degraded, the solution needs be replaced involving a significant cost.

Another process is temperature swing adsorption (TSA). Said process makes use of a solid adsorbent and requires alternate phases of heating and cooling of the solid adsorbent in order to carry out the adsorption and regeneration (desorption), respectively.

A TSA process for the separation of a target component from at least one side component in a gaseous mixture comprises basically: (a) an adsorption step in which the target component is adsorbed on an adsorbent bed and a side product-rich stream is produced; (b) a heating step of the loaded adsorbent during which the target component is released from the adsorbent bed and a target product-rich stream is produced; (c) a cooling step during which the adsorbent is cooled back to the adsorption temperature.

The TSA process is of great interest but still has some disadvantages.

A first drawback is a low separation performance, hence low recovery and low purity of the target product. In order to achieve a successful separation of the target component, novel adsorbents have been tested, but poor results have been achieved so far.

A second drawback is a high energy input (measured in MJ/kg of the recovered target product). Said energy input includes the thermal energy required to regenerate the adsorbent and desorb the target component. In most cases, the gaseous mixture and the obtained target component contain some water, and said energy input also comprises the thermal energy required for drying the target product.

Said two drawbacks are related. In particular, a low recovery of the target product implies a higher energy requirement for the drying operation, because more gas must be dried for the same target product production rate.

A further disadvantage is a low productivity of the target product, hence high capital cost. The term "productivity" refers to the mass flow rate of the target product produced per unit adsorbent mass and is measured in kg/h of recovered $CO_2$ over tons of adsorbent.

Referring in particular to the separation of carbon dioxide, the need for high performances, low energy consumption and low cost is strongly felt. $CO_2$ recovered from a flue gas can be used as chemical feedstock to produce urea or methanol or to enhance oil recovery; $CO_2$ capture from the fumes of a combustion process minimizes carbon dioxide emissions into atmosphere; $CO_2$ removal from air is also attractive for a number of industrial uses.

SUMMARY OF THE INVENTION

The invention aims to overcome the drawbacks of the prior art. In greater detail, the invention aims to provide a process which is able to achieve high purity and high recovery of the target component, low energy consumption, high productivity and low capital costs.

This aim is reached with a temperature swing adsorption process for removing a target component from a gaseous mixture according to claim 1.

Said process is carried out in a plurality of reactors and each reactor performs the following steps: (a) an adsorption step comprising contacting an input stream of said gaseous mixture with a solid adsorbent and comprising adsorption of target component from the input stream, providing an adsorbent loaded with said target component and a first waste stream depleted of the target component; (b) heating of the loaded adsorbent and desorption of a first amount of target component, providing a partially regenerated adsorbent and a first output stream containing the desorbed target component; (c) cooling of said at least partially regenerated adsorbent. During said cooling step (c), the adsorbent is advantageously cooled to a temperature suitable for carrying out the adsorption step (a), so that the cycle can start again.

The process of each reactor is characterized by:
a pre-cooling step (b1) before said cooling step (c), wherein said partially regenerated adsorbent is contacted with a waste stream depleted of the target component which is provided by at least one other reactor of said plurality of reactors while performing the adsorption step (a), wherein a second amount of target component is desorbed providing a second output stream containing the target component;
a pre-heating step (a1) after said adsorption step (a) and before said heating step (b), wherein said loaded adsorbent is contacted with a rinse stream containing the target component which is provided by at least one other reactor of said plurality of reactors while performing the pre-cooling step (b1), wherein an amount of target component contained in said rinse stream is adsorbed and a second waste stream depleted of the target component is produced.

Preferably, the adsorbent is a fixed bed adsorbent.

During the adsorption step (a) at least a portion of the target component contained in the input stream is adsorbed. Preferably the full amount or substantially the full amount of the target component in the input stream is adsorbed.

According to a preferred embodiment of the invention, a first reactor provides said waste stream for the pre-cooling step (b1), and a second reactor provides said rinse stream for the pre-heating step (a1). In other words, according to a preferred embodiment, a generic reactor while performing the above sequence of steps, interfaces with at least two other reactors, as it takes said pre-cooling waste stream from a first reactor of the plurality (source reactor of the pre-cooling waste stream), and takes said rinse stream from a second reactor (source reactor of the rinse stream) other than the first.

Advantageously, the above described steps of pre-cooling (b1) and pre-heating (a1) reduce the time required for the subsequent steps of cooling (c) and heating (b), respectively.

In some embodiments, said pre-cooling waste stream passes from the respective source reactor to the reactor wherein the pre-cooling step (b1) takes place, without any heat exchange, i.e. there is no heat exchanger between the reactors. In other embodiments, said pre-cooling waste stream is cooled before being used for said step (b1) of pre-cooling. Preferably, said pre-cooling waste stream is cooled in an external heat exchanger. Said external cooling enhances the adsorbent pre-cooling during step (b1) and further reduces the time required for the subsequent cooling step (c).

Preferably, said pre-cooling waste stream is cooled down to a temperature which is lower than the temperature of the gaseous mixture subjected to the adsorption step (a). Preferably said waste stream is cooled down to a temperature in the range 5° C. to 40° C. According to different embodiments it can be cooled to ambient temperature (e.g. 25° C.) or below ambient temperature (e.g. 10° C.).

In a similar way, said rinse stream used for the pre-heating step (a1) can be optionally heated before being subjected to said step (a1) of pre-heating. In some embodiments there is no heat exchanger between the source reactor of the rinse stream and the reactor undergoing the pre-heating step. In other embodiments said rinse stream is heated in an external heat exchanger. Said external heating enhances the adsorbent pre-heating during step (a1) and further reduces the time required for the subsequent heating step (b).

The embodiments wherein said waste and rinse streams are cooled and heated before said steps of pre-cooling (b1) and pre-heating (a1), respectively, provide a greater flexibility in terms of thermal exchanges. For example, by heating said rinse stream a greater amount of heat may be transferred to the reactor undergoing the pre-heating step (a1).

According to some embodiments, the heating step (b) comprises direct heat exchange with a heating medium in contact with the adsorbent. Accordingly, all or some of the heat transferred in the heating step (b) is transferred by direct heat exchange.

Preferably, said heating medium is a stream containing predominantly the target component. For example, said heating medium is provided by the above identified first or second output stream containing the target component.

Similarly, the cooling step (c) may comprise direct heat exchange with a cooling medium in contact with the adsorbent. Accordingly, all or some of the heat transferred in the cooling step (c) is transferred by direct heat exchange Preferably, said cooling medium is a stream depleted of the target component and preferably containing said at least one side component. For example, said cooling medium is provided by the above identified first or second waste stream depleted of the target component.

According to other embodiments, at least one of the heating (b) and the cooling (c) steps comprises indirect heat exchange. In such embodiments, all or some of the heat is transferred by indirect heat exchange.

Further embodiments comprise both direct and indirect heat exchange for said heating step (b) and/or said cooling step (c). Accordingly, the heat transferred in step (b) and/or (c) may be partially transferred via direct heat exchange and partially via indirect heat exchange.

Indirect heat exchange denotes that the heat exchange takes place with a surface of separation between the adsorbent and a heat transfer (heating or cooling) medium. In some embodiments, suitable heat exchange bodies such as plates or tubes are immersed in the adsorbent and fed with said medium. Some embodiments use tubes filled with the adsorbent and a heat exchange medium which is fed outside the tubes, for example in the shell side of an absorber.

When the heating step (b) and the cooling step (c) comprise indirect heat exchange, the heating step (b) can partially take place during the pre-heating step (a1). According to this embodiment, the heating step (b) is started in advance, thus reducing the overall time of the process and improving the productivity. In a similar way, the indirect cooling step (c) can partially take place during the pre-cooling step (b1).

Direct heat exchange has the advantage that the adsorbent is directly contacted with a heating or cooling medium, which avoids the installation of heat exchange bodies, thus reducing the thermal inertia and ensuring a better heat exchange. On the other hand, indirect heat exchange may be preferred because the absence of a contact between the adsorbent and the heating or cooling medium ensures a higher working capacity of the adsorbent and provides more freedom to select the heat exchange fluids.

In some embodiments of the invention, said rinse stream is exchanged from a reactor undergoing the pre-cooling step (b1) to another reactor undergoing the pre-heating step (a1) without an intermediate storage. This means that the pre-heating (a1) and the pre-cooling (b1) of two different reactors exchanging said rinse stream are synchronized and while one reactor performs the pre-cooling step (b1) the other reactor performs the pre-heating step (a1).

In other embodiments, said rinse stream is exchanged from a reactor undergoing the pre-cooling step (b1) to another reactor undergoing the pre-heating step (a1) with an intermediate storage in a suitable tank. This means that the pre-heating (a1) and the pre-cooling (b1) of two different reactors exchanging said rinse stream are not synchronized. The embodiments with said intermediate storage provide a greater flexibility since the duration of steps (a1) and (b1) of the two reactors may be different.

Similarly, the above identified waste stream may be exchanged with or without an intermediate storage in a suitable tank from a reactor undergoing the adsorption step (a) to another reactor undergoing the pre-cooling step (b1).

The pre-heating step (a1) entails adsorption of some of the target component contained in said rinse stream, which causes heat of adsorption to be released. Accordingly, step (a1) provides for an increased purity of the recovered target component. In addition, the applicant has surprisingly found that the pre-heating step (a1) is made faster due to the heat of adsorption released. This is beneficial especially for the productivity of the cycle.

The pre-cooling step (b1) entails desorption of an amount of target component not previously desorbed during step (b) and recycles the desorbed target component to another reactor undergoing the pre-heating step (a1), wherein it is recovered. Accordingly, step (b1) provides for an increased recovery of the target component. Moreover, the applicant has surprisingly found that the pre-cooling step (b1) is made faster due to the energy subtracted by the heat of adsorption, which is beneficial for the productivity of the cycle.

According to some embodiments, during the adsorption step (a) a portion of said at least one side component is unavoidably adsorbed together with the target component. According to a preferred embodiment, a preliminary heating step (a2) is performed after said pre-heating step (a1) and before said heating step (b), during which a gaseous product containing said at least one side component is released from the adsorbent and is then recirculated and submitted to a further adsorption step (a). Said gaseous product may be recycled to at least one other reactor undergoing the adsorption step (a) or to the same reactor from which it is released, after intermediate storage in a suitable tank.

The time duration of the preliminary heating step (a2) is preferably from 3 to 10 times the time duration of the pre-heating step (a1), more preferably six times the duration of the pre-heating step (a1). Moreover, the time duration of the heating step (b) is preferably from 15 to 70 times the time duration of the pre-heating step (a1). The time duration of the cooling step (c) is preferably from 10 to 50 times the time duration of the pre-cooling step (b1).

The above time durations allow obtain high values of purity and recovery, as well as high productivity and low energy consumption.

Indeed, a shorter time duration of the heating (b) or cooling (c) step would compromise the $CO_2$ purity and $CO_2$ recovery. On the other hand, a longer time duration would be beneficial in terms of purity and recovery, but detrimental for the productivity of the cycle.

A shorter time duration of the pre-heating step (a1) would instead decrease the energy consumption and improve the productivity, but would compromise the $CO_2$ purity. On the other hand, a longer time duration would increase the $CO_2$ purity, but worsen the productivity and increase the energy demand.

Hence, the time durations found by the applicant represent the optimal values.

During the preliminary heating step (a2) a portion of the target component can be desorbed together with the side component(s), which means that the gaseous product released during said preliminary heating step (a2) also contains a portion of the target component. The preliminary heating step (a2) is controlled in order to desorb a stream predominantly made of the side component(s) adsorbed during the previous adsorption step (a), and in order to reduce the desorption of the target component.

To this purpose, the preliminary heating step (a2) is carried out at a suitable low temperature. More in detail, said preliminary heating step (a2) reaches a temperature which is lower than the temperature reached during the subsequent heating step (b). Preferably, the temperature of the preliminary heating step (a2) is at least 40° C. lower than the temperature of the heating step (b).

Accordingly, the majority of the target component remains in the adsorbent to be released in the subsequent main heating step, and the gaseous effluent of the preliminary heating step (a2) contains a significant amount of the at least one side component. In preferred embodiments said gaseous effluent contains predominantly said at least one side component. Preferably, said gaseous product contains 20% or more of the side component, more preferably 50% or more of the side component. In typical embodiments it contains 30 to 80%, more preferably 50% to 80% of the side component.

The target component desorbed during the preliminary heating step (a2) can be recovered within the same reactor, after an intermediate storage, or within another reactor undergoing the adsorption step (a). When the gaseous product from preliminary heating of one reactor is sent to adsorption in another reactor, an intermediate storage in a suitable tank may also be provided in some embodiments.

According to a first embodiment, said preliminary heating step (a2) comprises indirect heat exchange. According to a second embodiment, said preliminary heating step (a2) comprises direct heat exchange with a heating medium in contact with the adsorbent, said heating medium being preferably a stream predominantly containing the target component.

The applicant has surprisingly found that the implementation of said preliminary heating step (a2) after said pre-heating step (a1) and before said heating step (b) entails reaching a high purity and recovery of more than 95% of the target component with a low energy consumption and a high productivity.

According to a preferred application of the invention, the target component is carbon dioxide. Preferably, said at least one side component includes nitrogen.

The gaseous mixture may contain some water. Water may be detrimental to the adsorption of the target component, e.g. water may compete with the target component during adsorption over a number of adsorbents. The process of the invention may include a preliminary step of removal of water from the gaseous mixture prior to adsorption of the target component, or may use a specific adsorbent which is also selective over water.

According to some embodiments, the adsorbent is selective for adsorption of the target component over the side component(s) and also over water. In the case of carbon dioxide as the target component, a chemical adsorbent chosen among MOF (Metal Organic Framework) CPO27, UTSA16, UIO66, amine-doped MOFs is preferably used thanks to its high capacity and high selectivity of adsorbing carbon dioxide over water.

According to further embodiments, the adsorbent comprises a first layer of a first material suitable for selectively adsorbing water and a second layer of a second material suitable for selectively adsorbing the target component (e.g. carbon dioxide). Accordingly, the adsorption step comprises removal of water in the first layer and then removal of the target component in the second layer. Said materials are preferably regenerated in the same temperature range.

According to further embodiments, said gaseous mixture is subjected to a dehydration process before contacting the adsorbent in order to at least partially remove water. Preferably, said dehydration process is carried out using an adsorbent material adapted to selectively adsorb water. Examples of such material include silica, activated alumina, 4A zeolite. In the case of carbon dioxide as target component and nitrogen as side component, adsorbents such as zeolite 13X, zeolite 5A, zeolite 4A, zeolite ZSM5, activated carbon are preferably used, having high capacity and high selectivity for the CO2 over the $N_2$.

A further aspect of the invention is a relatively low temperature of the heating step (b), that is a low regeneration temperature. Said temperature is preferably not greater than 250° C., more preferably not greater than 200° C. and even more preferably not greater than 170° C. A low regeneration temperature is an advantage because it entails a greater difference of temperature (delta-T) between the adsorbent and the available heat source, thus making regeneration more efficient.

The gaseous mixture can be a flue gas, for example from a combustion process. Said flue gas may come from a power plant or from a chemical process, according to preferred applications of the invention. The recovered target component can be sequestrated (e.g. $CO_2$ sequestration) or used in another process, depending on the case.

An object of the present invention is the use of the above described process for treating a flue gas of an ammonia or methanol or urea plant. In case of methanol or urea plant, some embodiments include the use of recovered $CO_2$ as a feedstock.

A plant for carrying out said process is also object of the present invention.

The present invention allows to operate several reactors in a synchronous manner, with the operating cycles of the different reactors properly shifted in time. This is advantageous for most applications, wherein a continuous operation is desired.

Cycle scheduling consists in determining the number, sequence and duration of the cycle steps, including any necessary idle times, and the number and connections of reactors required to run a continuous operation. This has an effect on the effective productivity of the cycle, defined as the amount of produced target compound per unit time and adsorbent mass.

The schedule will depend on the imposed constraints, e.g. continuous feed, continuous production, synchronization of pre-heating (a1) and pre-cooling (b1) steps. A further constraint that may be considered for the TSA cycle of the invention is that of having a reactor starting the cooling step (c) at the same time when another reactor starts the heating step (b), thus allowing the reuse of a hot thermofluid present in the former reactor to heat up the latter reactor (so called temperature equalization).

For $CO_2$ capture from flue gases, the scheduling shall ensure the possibility to treat a continuous feed and produce a target component stream at all times, while at the same time guaranteeing: synchronization of pre-heating (a1) and pre-cooling (b1) steps, and synchronous start of the heating (b) and cooling (c) steps. The advantages of the invention will be elucidated with the help of the following description of preferred and non-limiting embodiments.

DETAILED DESCRIPTION OF PREFERRED EMBODIMENTS

First Embodiment

Figure 1:
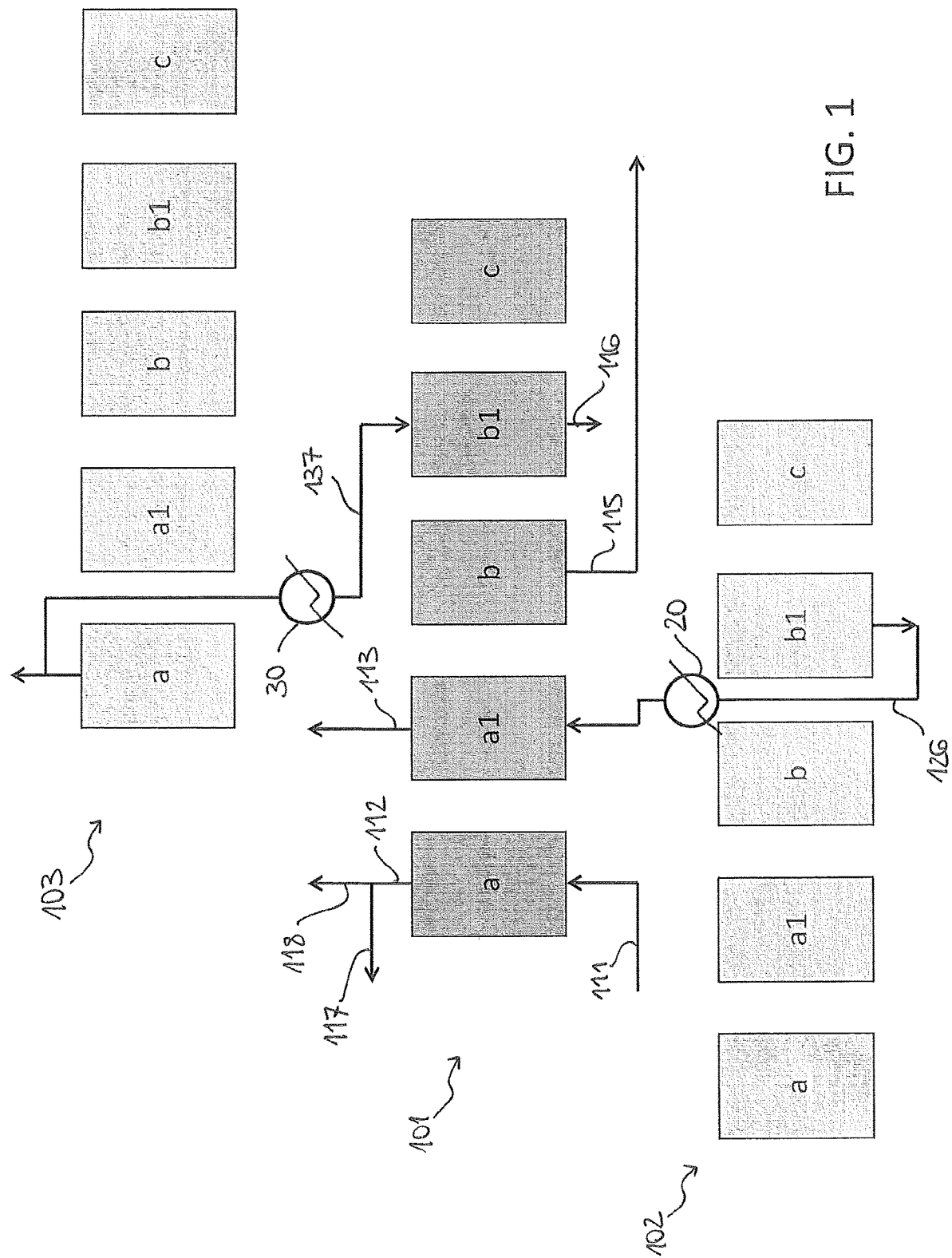
FIG. 1 is a block diagram of a temperature swing adsorption process for removing the carbon dioxide from a flue gas, according to a first embodiment of the invention.

Referring to FIG. 1, the process of the invention is carried out in a plurality of reactors, for example including reactors 101, 102, 103. Each reactor 101-103 contains a fixed bed of an adsorbent for a target component, for example zeolite 13X for adsorption of $CO_2$.

Each reactor performs a number of steps, namely: an adsorption step (a), a pre-heating step (a1), a main heating step (b), a preliminary cooling step (b1) and a cooling step (c). The reactors are interconnected and, during some of said process steps, a reactor may exchange one or more stream(s) with one or more other reactor(s). In FIG. 1, the blocks (a), (a1), (b), (b1), (c) denote the reactors 101, 102, 103 while performing said process steps.

During adsorption step (a), a gas to be treated, for example a flue gas, is admitted to the reactor and the target component is adsorbed, resulting in a waste stream and partially loading the adsorbent with the target component.

During the pre-heating step (a1), the adsorbent is slightly heated by direct contact with a stream rich of the target component which comes from the preliminary cooling step (b1) of another reactor. As a consequence, a further amount of the target component can be adsorbed and the one or more side components are expelled, thus generating another waste stream. During the main heating step (b), the adsorbent is heated by direct or indirect heat exchange, resulting in desorption of the target component and regeneration of the adsorbent. Step (b1) is a preliminary cooling which is made with the help of at least a portion of a waste stream (mainly containing the one or more side components) taken from the adsorption step (a) of another reactor. Step (c) is the main cooling which brings the adsorbent back to the adsorption temperature in order to start again the cycle with step (a).

Said steps and said interactions between the reactors will be described with a greater detail with reference to the working cycle of reactor 101.

Adsorption Step (a)

A flue gas 111 coming from a combustion process and containing predominantly carbon dioxide ($CO_2$) and nitrogen ($N_2$) is supplied to the reactor 101, where $CO_2$ is adsorbed over the zeolite bed of the reactor, the $CO_2$ having a greater affinity with said adsorbent compared to nitrogen.

As a result, step (a) provides a $CO_2$-loaded adsorbent and a $CO_2$-depleted effluent 112, containing predominantly $N_2$. A portion 117 of said effluent 112 can be used for the pre-cooling step (b1) of another reactor (for example of reactor 103), as will be explained below. The remaining portion 118 of the effluent 112 is exported and can be vented or used for a further scope if appropriate. For example in an ammonia plant, said stream 118, which is rich in nitrogen, can be used for the synthesis of ammonia.

Preferably, the adsorption step (a) takes place at ambient temperature, for example at a temperature in the range 15 to 30° C. Preferably said step (a) is carried out upflow, which means that the flue gas 111 is supplied from the bottom of the reactor 101 and the waste stream 112 leaves the reactor 101 from the top, being $N_2$ lighter than $CO_2$.

Pre-Heating Step (a1)

The reactor 101 receives a gaseous $CO_2$-rich rinse stream 126 produced by another reactor of the plurality, for example by the reactor 102, while performing the pre-cooling step (b1). Said rinse stream 126 is fed to the bottom of the reactor 101, meaning that step (a1) is carried out in the same upflow direction as step (a).

The rinse stream 126 is optionally heated in an external heat exchanger 20 prior to admission to said reactor 101. For example the rinse stream 126 is heated to a temperature of 343 K (70° C.).

During said pre-heating step (a1), some of the carbon dioxide contained in the rinse stream 126 is adsorbed over the adsorbent bed, which is already partially loaded with $CO_2$ as a consequence of the previous adsorption step (a); a second waste stream 113 mainly containing $N_2$ is obtained, which is exported and can be vented or used in the process, similarly to the above mentioned stream 118.

In some embodiments, the pre-heating step (a1) of reactor 101 and the pre-cooling step (b1) of the reactor 102 are synchronized, which means that the rinse stream 126 leaving the reactor 102 passes into the reactor 101 without an intermediate storage. In other embodiments, said $CO_2$-rich gas 126, produced by the pre-cooling step (b1) of reactor 102, is stored in a suitable tank (not shown) outside the source reactor 102 and subsequently introduced into the reactor 101 for the above described step (a1). The latter embodiment with intermediate storage may provide a greater flexibility since the duration of steps (a1) and (b1) of the two reactors may be different.

Main Heating Step (b)

The $CO_2$-loaded adsorbent is heated, for example to 420 K (147° C.); as a consequence, $CO_2$ is desorbed producing a current 115 of $CO_2$ of a high purity and the adsorbent of the reactor 101 is regenerated.

The main heating step (b) can be performed either by means of indirect heat exchange or direct heat exchange.

In case of indirect heat exchange, one of the reactor ends is kept open while the other is kept closed, meaning that it is a semi-open heating step.

In case of direct heat exchange, a hot regeneration medium is supplied to the reactor for direct contact with the adsorbent. Preferably, both ends of the reactor 101 are kept open and said regeneration medium flows opposite with respect to steps (a) and (a1), namely from the top to the bottom. Preferably said regeneration medium is made predominantly of $CO_2$ (i.e. of the target component).

Preliminary Cooling Step (b1)

The adsorbent in the reactor 101 is purged with a pre-cooling waste stream 137 which results from the main adsorption step (a) of another reactor, for example of reactor 103. Said stream 137 is similar in composition to the previously described stream 117 obtained in the reactor 101 itself.

Said waste stream 137 is fed to the reactor 101 from the top, meaning that step (b1) is carried out in the opposite flow direction with respect to steps (a) and (a1).

Said waste stream 137 is optionally cooled in an external heat exchanger 30 prior to admission into the reactor 101. For example the waste stream 137 is cooled to a temperature of 283 K (10° C.).

During said pre-cooling step (b1), the pre-cooling stream 137 "cleans" the adsorbent by displacing a $CO_2$-rich stream 116, so that more $CO_2$ can be adsorbed during the adsorption step (a) and the recovery is increased. Said $CO_2$-rich stream 116 can be used for the pre-heating step (a1) of another reactor, in the same manner as the $CO_2$-rich stream 126 previously described.

In some embodiments, the adsorption step (a) of reactor 103 and the preliminary cooling step (b1) of reactor 101 are synchronized, so that the waste stream 137 leaving the reactor 103 passes into the reactor 101 without an intermediate storage. In other embodiments, a storage tank for said stream 137 is provided.

Cooling Step (c)

The adsorbent is cooled down to the adsorption temperature in order to restart the cycle. Said cooling step (c) can be carried out either at constant pressure, where one end of the reactor 101 is kept open and the other end is kept closed, or under slightly vacuum conditions, where both ends of the reactor 101 are closed.

The other reactors, such as reactors 102 and 103, perform the same steps.

Second Embodiment

Figure 2:
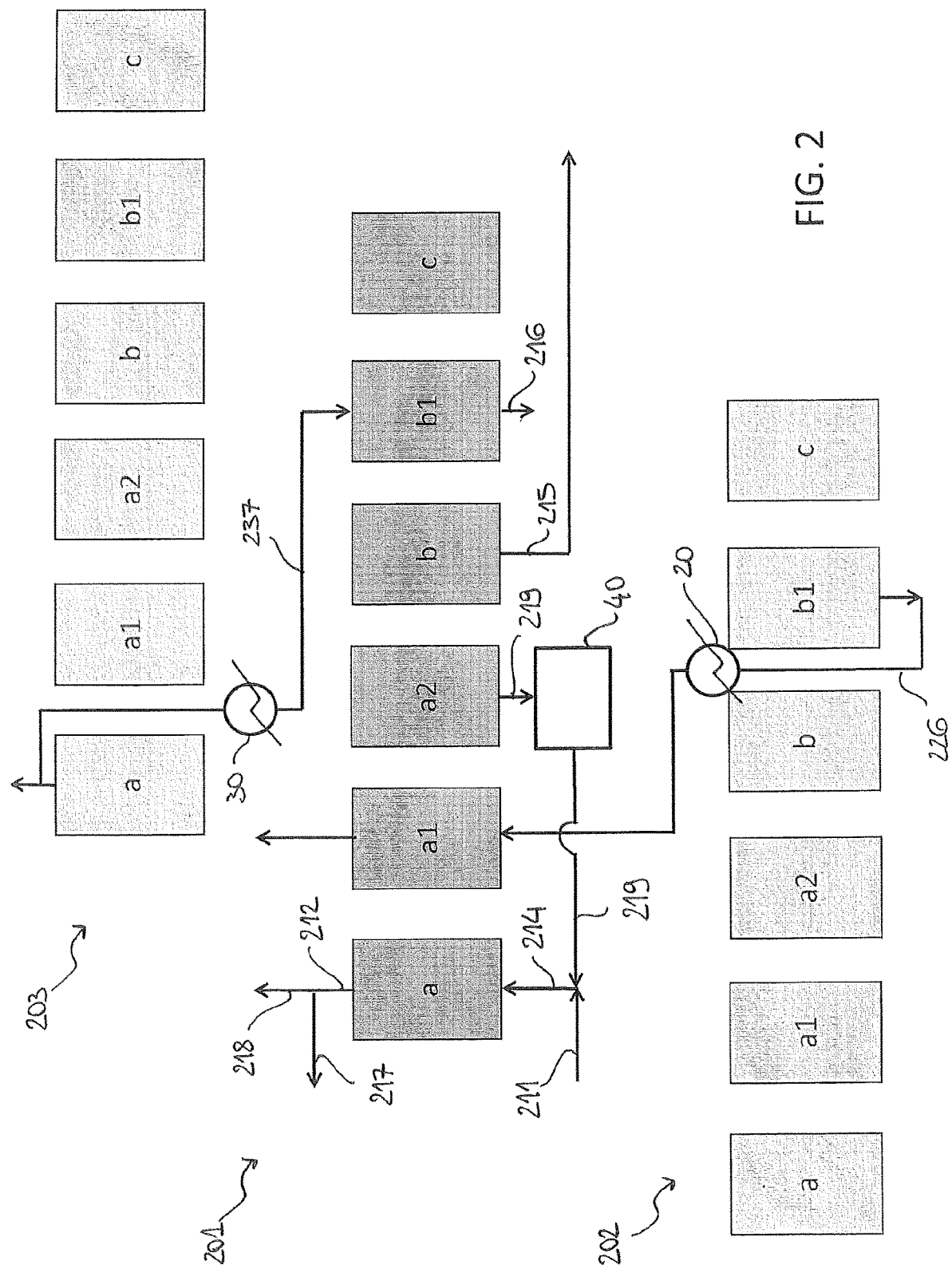
FIG. 2 is a block diagram of a temperature swing adsorption process, according to a second embodiment of the invention.

Referring to FIG. 2, the process of the invention is carried out in a plurality of reactors, for example including reactors 201, 202, 203. Each reactor 201-203 contains a fixed bed of an adsorbent for a target component, for example zeolite 13X for adsorption of $CO_2$.

Each reactor performs a sequence of steps which is the same sequence as the first embodiment, with the addition of a preliminary heating step (a2), after the pre-heating step (a1) and before the main heating step (b). The steps common to the first embodiment are not described in detail for the sake of brevity.

Combining steps (a1) and (b1) with a further pre-heating step (a2) gives rise to a synergy, which allows obtain the high recovery and purity of step (a2) and the low energy consumption of steps (a1) and (b1).

Referring to a reactor 201, a gas mixture 211 containing predominantly carbon dioxide ($CO_2$) and nitrogen ($N_2$) is mixed with a gaseous product 219 predominantly containing $N_2$ and a small amount of $CO_2$, obtained from said preliminary heating step (a2), to provide a gaseous input stream 214.

Said input stream 214 is supplied to the reactor 201 for the adsorption step (a) wherein a waste stream 212 is produced and the adsorbent is loaded with $CO_2$. A portion 217 of the waste stream can be used for pre-cooling of another reactor and the remaining portion 218 is exported or vented.

Then, the reactor 201 undergoes the pre-heating step (a1) with the help of a rinse stream 226 from the reactor 202 undergoing the preliminary cooling step (b1), optionally with intermediate heating in the exchanger 20.

Then, the reactor 201 undergoes the preliminary heating step (a2), during which the $CO_2$-loaded adsorbent contained in the reactor 201 is further heated. The temperature reached by the adsorbent during said preliminary heating step (a2) is lower than the temperature reached during the subsequent main heating step (b). For example, the adsorbent is heated to a temperature ranging between 360 and 380 K (i.e. between 87 and 107° C.) during said preliminary heating step (a2).

During said step (a2), the nitrogen and a small amount of $CO_2$ are desorbed providing the gaseous product 219. During said step (a2), the pressure is kept constant and only the bottom end of the reactor is kept open.

In some embodiments, the so obtained gaseous product 219 is stored in a tank 40 and subsequently mixed with the flue gas 211 to provide the gaseous stream 214 feeding the adsorption step (a), in order to recover the $CO_2$ contained therein. In other embodiments (not shown), said gaseous product 219 is mixed with the flue gas feed of another reactor, for example of reactor 202 or 203.

After the preliminary heating step (a2), the reactor 201 undergoes the sequence of main heating (b), pre-cooling (b1) and cooling (c), which are equivalent to the same steps of the first embodiment. In particular, the pre-cooling step (b1) is carried out with the help of a pre-cooling waste stream 237 taken from another reactor, e.g. from reactor 203, optionally with intermediate cooling in a heat exchanger 30. The main heating (b) releases a stream 215 of the target component, in this case of $CO_2$.

The other reactors, such as reactors 202 and 203, perform the same steps.

COMPARATIVE EXAMPLES

Example 1: Prior Art

A combustion flue gas containing carbon dioxide, nitrogen, argon and saturated with water is subjected to a dehydration process to remove water. The energy consumption of the dehydration process is 8 MJ/(kg $H_2O$ removed).

A flue gas with the following dry molar composition:

$CO_2$=0.12,$N_2$=0.85,Ar+$O_2$=0.03 is obtained and subjected to adsorption (a) at a temperature of 300 K (27° C.) and 1.3 bar abs in a reactor over a commercial zeolite 13X as adsorbent, in order to separate the carbon dioxide (i.e. the target component) from nitrogen, argon and oxygen (i.e. the side components).

Said process provides an adsorbent partially loaded with $CO_2$ and a waste stream mainly containing nitrogen. The partially loaded adsorbent is subjected to a heating step (b), wherein it is heated to 420 K (147° C.) and a $CO_2$-rich stream is collected as target product. At the end of the heating step, the adsorbent is subjected to a cooling step (c), wherein it is cooled down to the adsorption temperature of 300K (27° C.). Said steps of heating and cooling occur by indirect heat exchange with external fluid streams.

Figure 4:
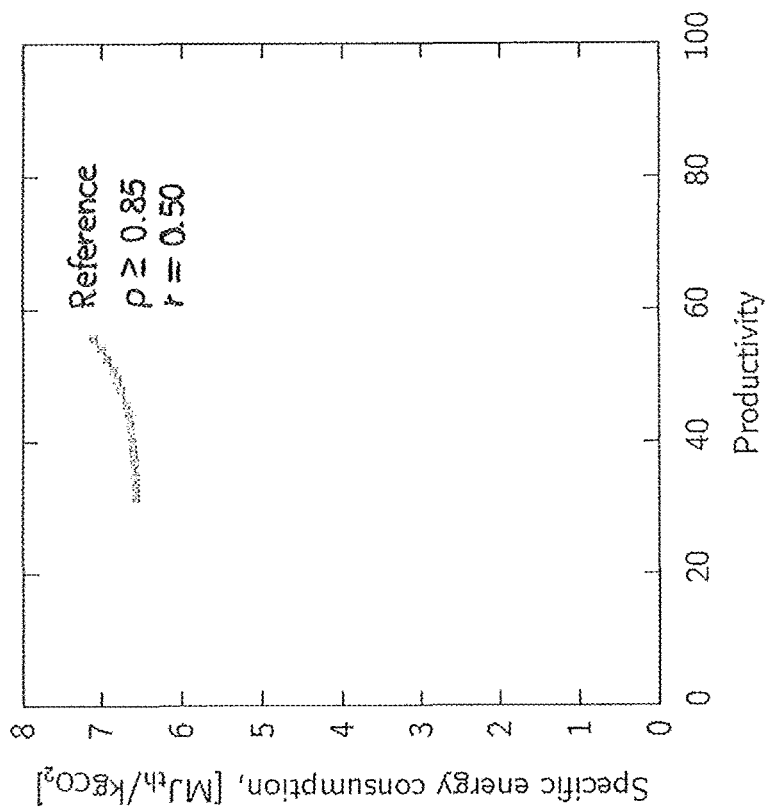
FIG. 4 is a productivity vs energy consumption curve of a TSA process according to the prior art.
Figure 3:
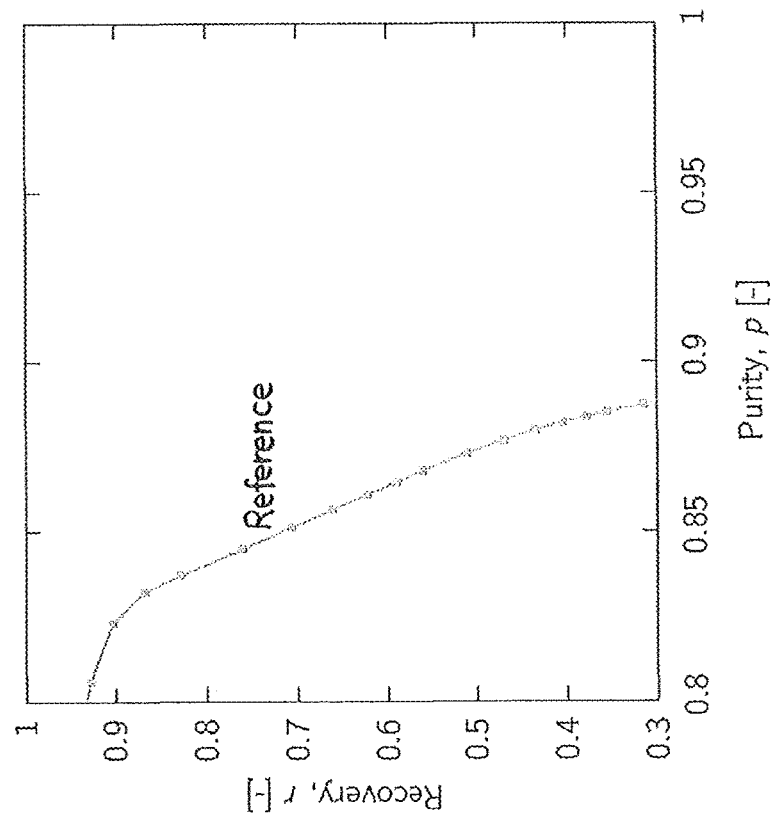
FIG. 3 is a purity vs recovery curve of a TSA process according to the prior art.

By varying the time duration of the above three steps of adsorption (a), heating (b) and cooling (c), the curves of FIGS. 3 and 4 have been identified with computer simulation.

The curve of FIG. 3 delimits the maximum feasible $CO_2$ purity and $CO_2$ recovery in a two dimensional plot of purity vs recovery. As shown in FIG. 3, the maximum feasible purity is 88% and is achievable only for a recovery of less than 30%. On the other hand, the maximum feasible recovery is 90% and is achievable only with a purity of less than 80%.

The curve of FIG. 4 delimits the energy requirement and the productivity of said process in a two dimensional plot of productivity vs specific energy consumption. The productivity is indicated as a number between 0 and 100 of a reference value and only the data points with purity higher than 85% and recovery of 50% have been considered to determine said curve.

As shown in FIG. 4, the thermal energy required for the process is in the range 6.5 to 7.5 MJ/kg$CO_2$ and the productivity is in the range 30% to 60% of the reference value.

The productivity is negatively impacted by the time duration of the heating and cooling steps; in particular, any time that is not used to adsorb $CO_2$ from the feed or desorb it into the product is wasted. Moreover, the thermal inertia of the equipment (e.g. the adsorbent, the adsorber pressure vessel, the heat transfer elements) affect negatively the time duration of the process.

Example 2: First Embodiment of the Invention

A combustion flue gas with the same composition of the gas of the previous example is subjected to dehydration and subsequently to adsorption (a) inside a first reactor.

The adsorption provides an adsorbent partially loaded with $CO_2$ and a waste stream mainly containing nitrogen. During the subsequent pre-heating step (a1), the loaded adsorbent is contacted with a $CO_2$-rich rinse stream provided by a second reactor undergoing a pre-cooling step (b1) and heated to 343 K (70° C.) in an external heat exchanger. The $CO_2$ contained in said rinse stream is adsorbed and a further waste stream containing nitrogen is released.

The resulting loaded adsorbent is subjected to the main heating step (b), wherein it is heated to 420 K (147° C.) and a $CO_2$-rich stream is collected as target product. At the end of the heating step, the adsorbent undergoes the pre-cooling (b1), during which it is purged with a portion of a waste stream containing nitrogen provided by a third reactor undergoing the adsorption step (a) and cooled down to 283 K (10° C.) in an external cooler. The adsorbent is finally cooled down to the adsorption temperature of 300 K (27° C.) by indirect cooling (c).

Figure 5:
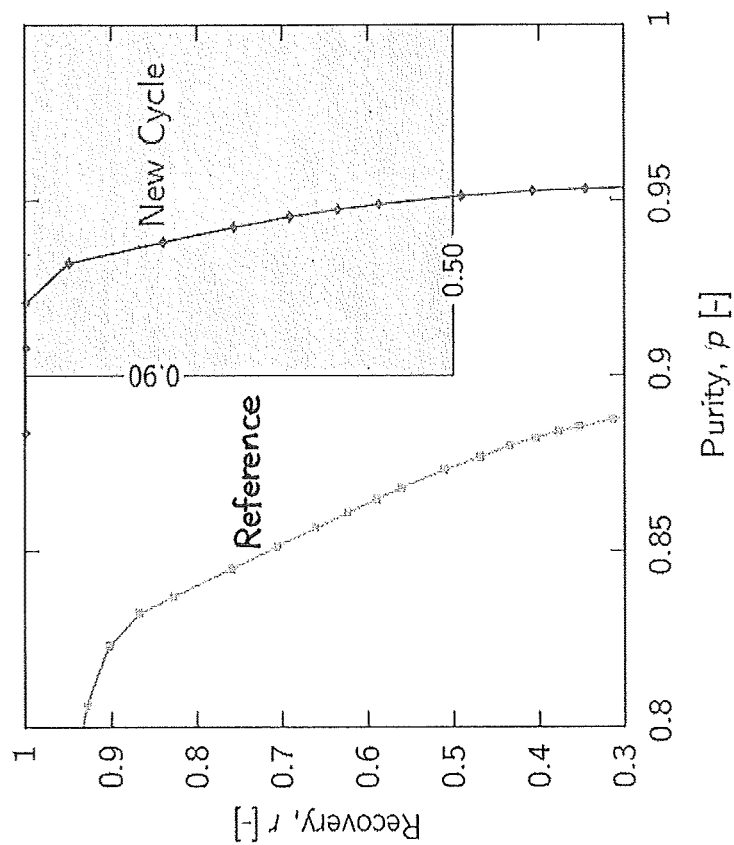
FIG. 5 shows a purity vs recovery curve of a TSA process according to the embodiment of FIG. 1, in comparison with a curve of the prior art.

FIG. 5 shows the curves delimiting the feasible $CO_2$ purity and $CO_2$ recovery for the process of the invention and the process of the prior art.

The new process largely outperforms the process of the prior art, according to which more than 90% of the $CO_2$ can be recovered with a purity higher than 90%. Moreover, the much improved separation performance does not entail either a higher energy requirement or lower productivity, as evident from FIG. 6.

Figure 6:
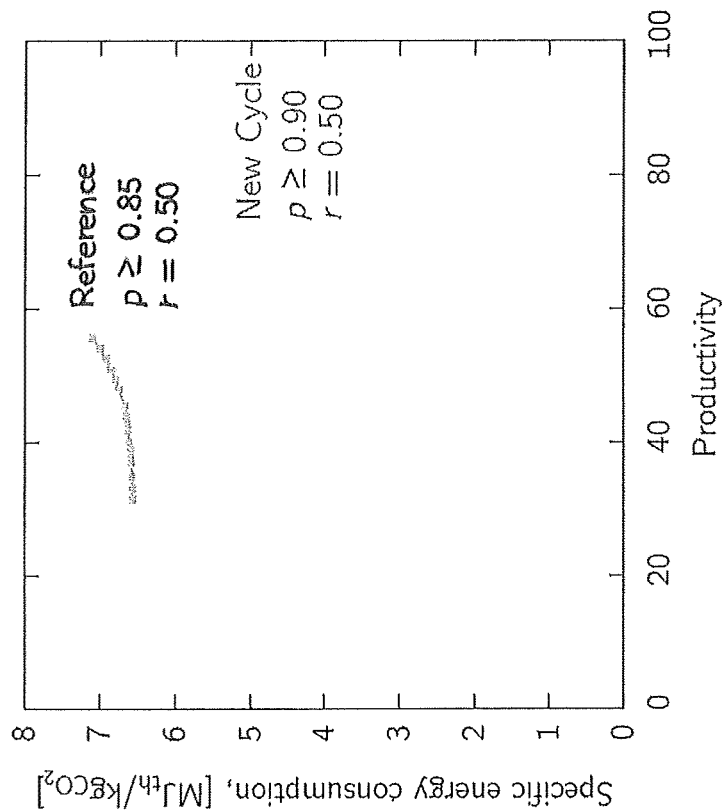
FIG. 6 shows the energy consumption and productivity of one operating point of the TSA process according to the embodiment of FIG. 1, in comparison with the curve of the energy consumption and productivity of the prior art.

FIG. 6 shows a point delimiting the energy requirement and the productivity of the process of the invention, compared with a corresponding curve of the prior art. Such point has been determined by considering the data points with purity of 90% and recovery of 50%.

Despite the higher purity and recovery achieved compared to the prior art, the new TSA process has a much lower energy consumption (i.e. 70% of the prior art) and a much higher productivity (i.e. 70% instead of 30-60%).

Hence, the process of the invention has higher recovery and purity, lower consumption, higher productivity and lower capital cost.

Example 3: Second Embodiment of the Invention

As for example 2, a dried flue gas is subjected to an adsorption step (a) inside a first reactor.

The adsorption provides an adsorbent partially loaded with $CO_2$ and a waste stream mainly containing nitrogen. During the subsequent pre-heating step (a1), the loaded adsorbent is contacted with a $CO_2$-rich rinse stream provided by a second reactor undergoing a pre-cooling step (b1) and heated to 343 K (70° C.) in an external cooler. The $CO_2$ contained in said rinse stream is adsorbed and a further waste stream containing nitrogen is released.

At the end of this step, the adsorbent undergoes another pre-heating step (a2), during which it is heated to a temperature of 360 K to 380 K (87-107° C.), providing a gaseous product manly containing nitrogen and some carbon dioxide. Said gaseous product is collected in a tank and subsequently mixed with the flue gas feed.

The resulting adsorbent is subjected to the main heating step (b), wherein it is heated to 420 K (147° C.) and a $CO_2$-rich stream is collected as target product. At the end of the heating step, the adsorbent undergoes the pre-cooling (b1), during which it is purged with a portion of a waste stream containing nitrogen provided by a third reactor undergoing the adsorption step (a) and cooled down to 283 K (10° C.) in an external cooler. The adsorbent is finally cooled down to the adsorption temperature by indirect cooling (c).

Figure 7:
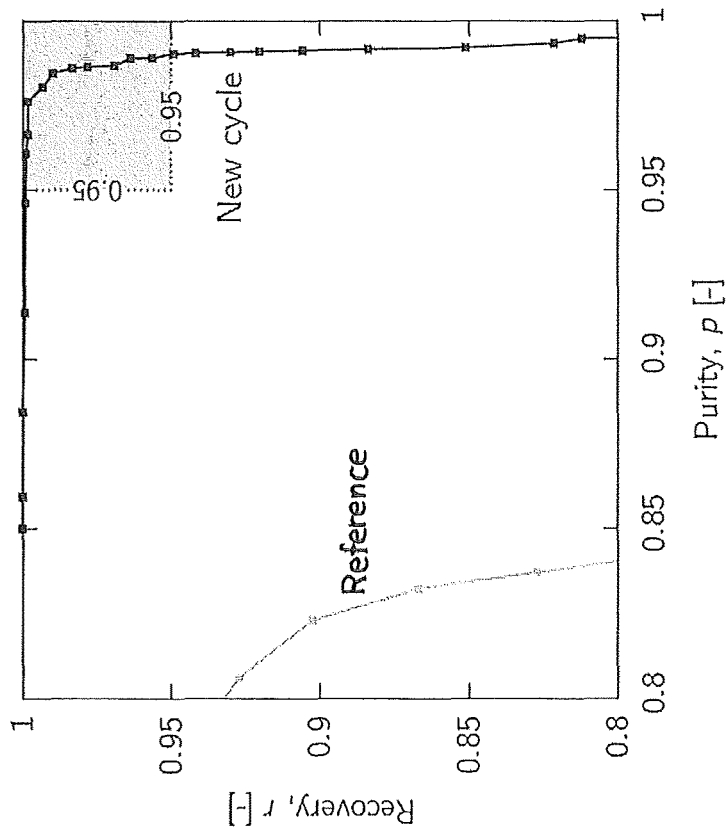
FIG. 7 shows a purity vs recovery curve of a TSA process according to the embodiment of FIG. 2, in comparison with a curve of the prior art.

FIG. 7 shows the curves delimiting the feasible purity and recovery for said process of the invention and the process of the prior art.

The new process largely outperforms the process of the prior art, according to which more than 95% of the $CO_2$ can be recovered at a purity higher than 95%. Moreover, the much improved separation performance does not entail either a higher energy requirement or lower productivity, as evident from FIG. 8.

Figure 8:
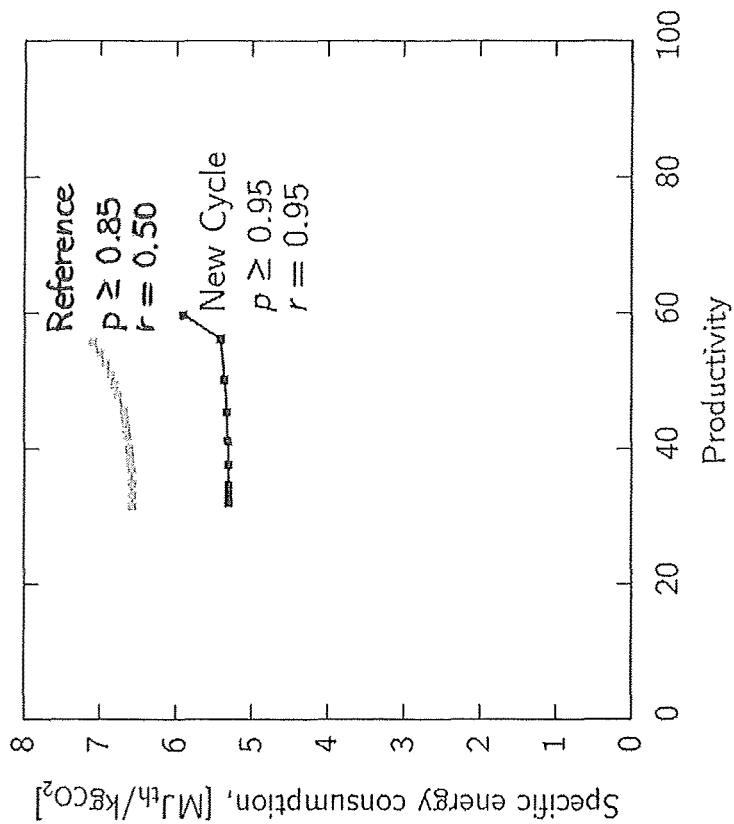
FIG. 8 shows a productivity vs energy consumption curve of a TSA process according to the embodiment of FIG. 2, in comparison with a curve of the prior art.

As shown in FIG. 8, the second new TSA process has much lower energy consumption and similar productivity than the prior art even at very much higher separation specifications. The curve calculated for the new process has an energy requirement in the range of 5-6 MJ/kg of CO2 and a productivity in the range of 30-60%.

Figure 9:
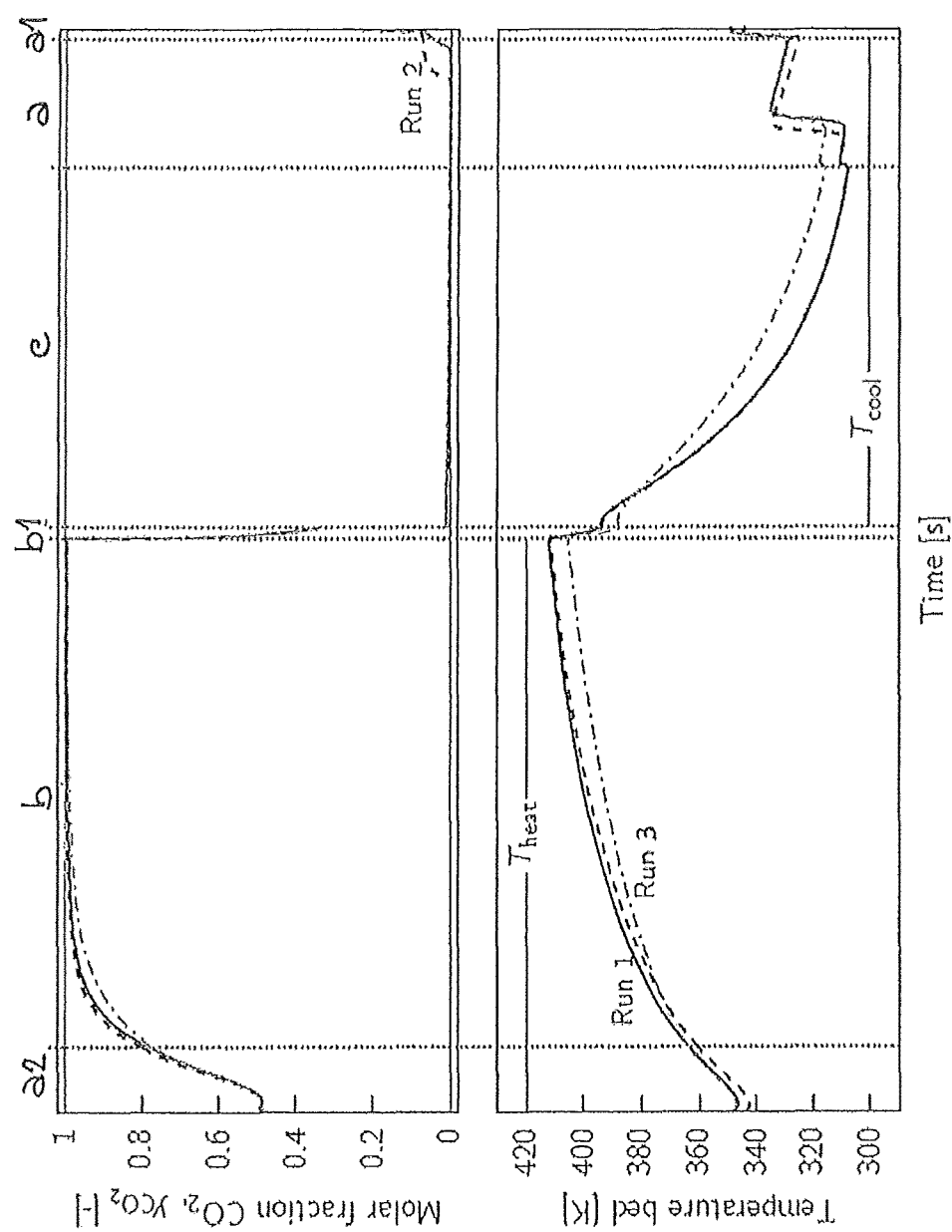
FIG. 9 shows the outlet temperature and composition profiles over time of one reactor undergoing all cycle steps of a TSA process according to the embodiment of FIG. 2.
Figure 10:
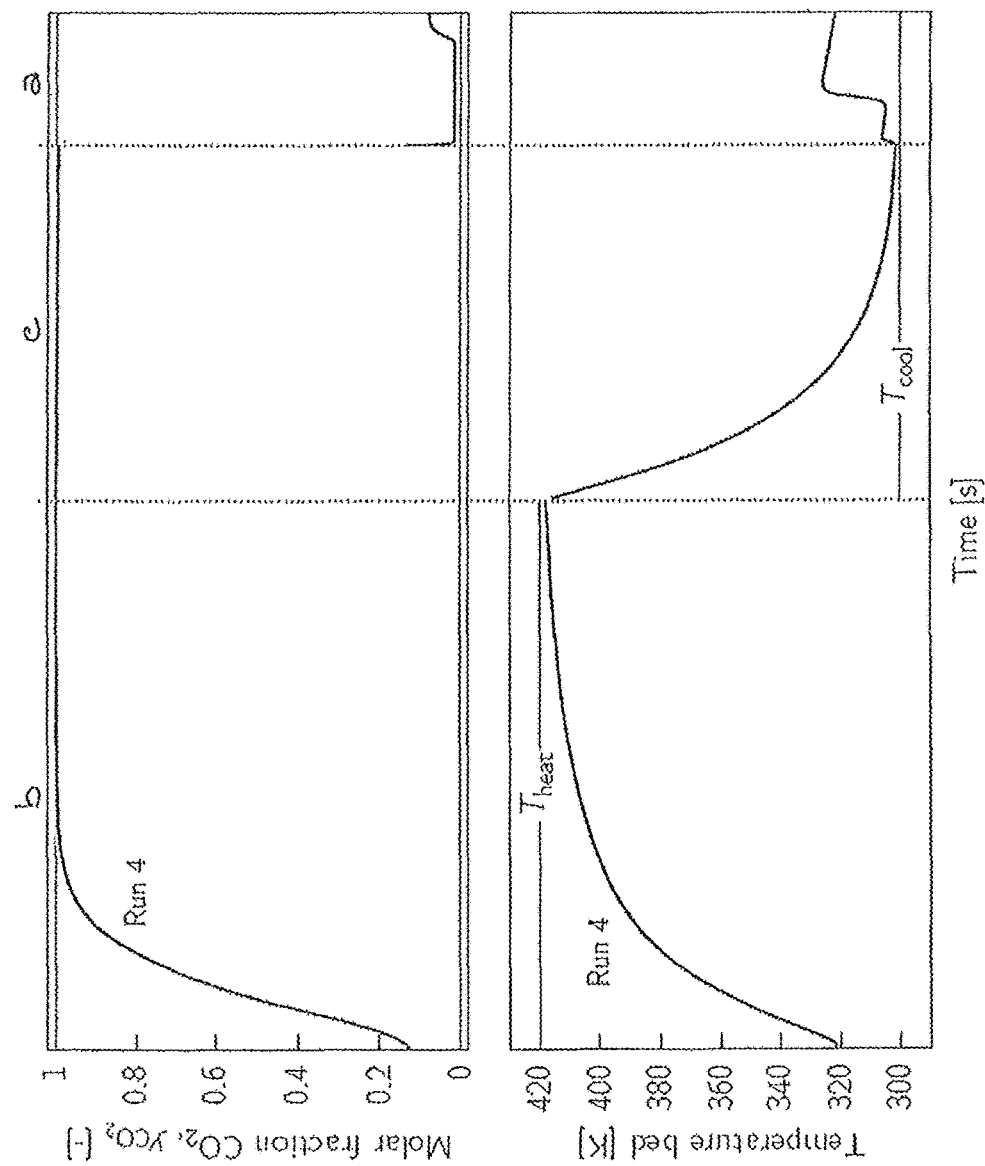
FIG. 10 shows the outlet temperature and composition profiles over time of one reactor undergoing all cycle steps of a TSA process according to the prior art.

FIGS. 9 and 10 show the outlet temperature and composition profiles of one reactor undergoing all cycle steps of the process according to the second embodiment of the invention (i.e. example 3, FIG. 2) and the process according to the prior art (i.e. example 1) under exemplary operating conditions, respectively.

Three simulations (Runs 1-3) have been carried out for the process according to the invention using different times for the steps a, b, c and one simulation (Run 4) has been carried out for the process according to the prior art. The applied times are reported in Table 1.

In FIG. 9 the outlet composition and temperature profiles are represented with solid line (Run 1), dashed line (Run 2) and dash-dotted (Run 3). A scaled time axis is used so as, though the duration of the same step in the different runs is different, the same interval along the horizontal coordinate is used for all the cases.

The resulting performances of the above processes are also reported in Table 1, with respect to the following parameters: $CO_2$ purity ($\Phi$), $CO_2$ recovery ($r_{TSA}$) and energy consumption ($e_{TSA}$).

The $CO_2$ purity $\Phi$ is calculated as the average composition of the $CO_2$ product:

$$\Phi = \frac{n^P_{CO_2}}{n^P_{CO_2} + n^P_{N_2}}$$

where $n_{CO_2}^P$ is the amount of $CO_2$ produced from one reactor during one cycle and collected in the target product, and $n_{N2}^P$ is the amount of $N_2$ collected in the same target product.

The $CO_2$ recovery $r_{TSA}$ is the fraction of $CO_2$ recovered in the target product:

$$r_{TSA} = \frac{n^P_{CO_2}}{n^F_{CO_2}\varphi}$$

where $n_{CO_2}^F$ is the amount of $CO_2$ fed to the process during one cycle and is the fraction of flue gas processed in the TSA.

The specific thermal energy consumption $e_{TSA}$ of the TSA unit is determined by integrating the heat flow into one reactor ($Q_{in}$) during one cycle:

$$e_{TSA} = \frac{1}{n^P_{CO_2}} \int_0^{t_{cycle}} \max(0, \dot{Q}_{in}) dt$$

TABLE 1

| | | Second Embodiment | | | Prior Art |
|---|---|---|---|---|---|
| | | Run 1 | Run 2 | Run 3 | Run 4 |
| $t_{step\ a2}$ | [s] | 150 | 150 | 150 | — |
| $t_{step\ b}$ | [s] | 1200 | 1200 | 800 | 2100 |
| $t_{step\ b1}$ | [s] | 25 | 25 | 25 | — |
| $t_{step\ c}$ | [s] | 850 | 850 | 600 | 1450 |
| $t_{step\ a}$ | [s] | 300 | 400 | 250 | 300 |
| $t_{step\ a1}$ | [s] | 25 | 25 | 25 | — |
| $\Phi$ | [—] | 0.968 | 0.974 | 0.962 | 0.833 |
| $r_{TSA}$ | [—] | 0.901 | 0.770 | 0.875 | 0.802 |
| $e_{TSA}$ | [MJ/kgCO$_2$] | 4.39 | 4.07 | 5.00 | 5.73 |

The simulations of the process according to the invention have been carried out for the optimal time duration of steps a, a1, a2, b, b1 and c based on the following reasons.

The absolute values of the optimal time duration of each step may vary according to the geometry of the reactor, in particular according to the ratio of heat exchange surface over volume of the adsorbent. However, the applicant has found that the following relative values are substantially constant even for different geometries: time duration of step (a2) over time duration of step (b); time duration of step (c) over time duration of step (b); time duration of step (a1) over time duration of step (a); time duration of step (b1) over time duration of step (a).

Although longer times of the pre-cooling step (b1) are beneficial to the recovery since more $CO_2$ is desorbed prior to the adsorption step (a), they are not beneficial to the $CO_2$ purity. In fact, an increase in purity is only achieved if the average $CO_2$ content of the rinse stream is larger than that of the feed and this is the case for short times of pre-cooling (b1); on the other hand, in the case of long pre-cooling times, the nitrogen contained in the waste stream leaves the reactor diluting the rinse stream.

Moreover, the heat effects arising during said steps of pre-cooling (b1) and pre-heating (a1) are beneficial to both energy consumption and productivity. In fact, the desorption of $CO_2$ happening during the pre-cooling step (b1) cools down the bed, thus requiring a shorter cooling step (c), while the heat released during the pre-heating step (a1) due to $CO_2$ adsorption contributes to heat the bed before the actual heating step (b). This is indeed observed in the temperature profiles shown in FIG. 9.

As shown in table 1, the $CO_2$ purity ($\Phi$) obtained with the process of the invention is much greater than the purity obtained with the process of the prior art, namely 0.968 (Runs 1), 0.974 (Run 2) and 0.962 (Run 3) against 0.833 (Run 4). An increased purity is obtained in the process of the invention thanks to the presence of the pre-heating step (a1), during which the loaded adsorbent is enriched with the $CO_2$ contained in the rinse stream and a further $N_2$-containing stream is released. As a result of this, the overall recovery of $CO_2$ is also increased.

Moreover, the $CO_2$ purity of the process of the invention is able to approach 100% because during the preliminary heating step (a2) the resulting N2-containing product is not collected in the target product but submitted to a further adsorption step (a).

The applicant has surprisingly found that the implementation of the preliminary heating step (a2) after said pre-heating step (a1) and before said heating step (b) has a significantly beneficial effect on the purity of the $CO_2$ product without compromising the productivity and energy consumption. This effect was completely unexpected.

Indeed, a skilled person desirous to recover more than 95% of $CO_2$ with a purity higher than 95%, while maintaining low energy consumption and achieving high productivity, would have never considered to implement the preliminary heating step (a2) in a process according to FIG. 1, thus obtaining a process according to FIG. 2. This is justified by the following considerations.

A process comprising the sequence of steps (a), (a1), (b), (b1), (c) as in FIG. 1 allows obtaining high $CO_2$ purity, which is however not unitary especially for high $CO_2$ recovery (as evident from FIG. 5). On the other hand, a process comprising the sequence of steps (a), (a2), (b), (c) would be characterized by high energy consumptions and low productivity, because the step (a2) of preliminary heating consumes energy and time and does not produce $CO_2$.

As a consequence, a skilled person would have not contemplated to introduce the step (a2) of preliminary heating in the process of FIG. 1, providing the process of FIG. 2, in order to further increase the $CO_2$ purity especially at high $CO_2$ recovery, while achieving low energy consumption and high productivity.

Figure 11:
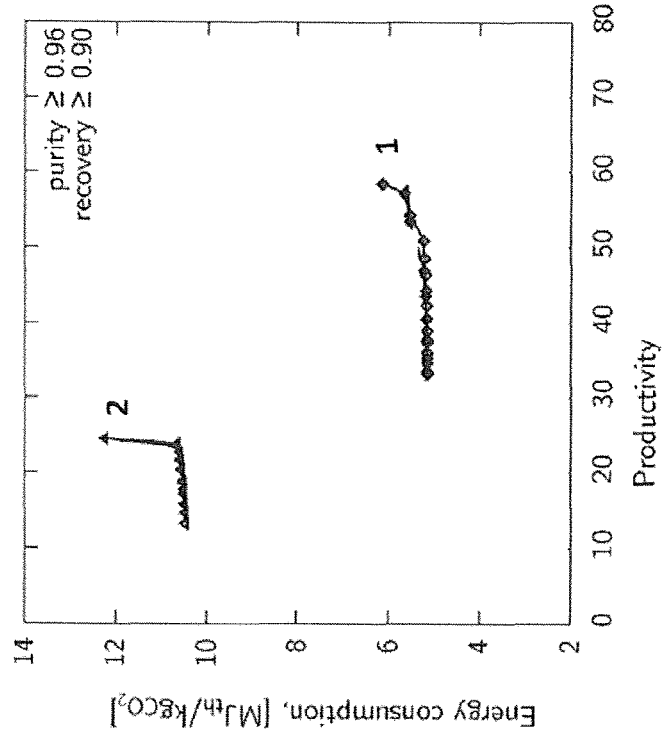
FIG. 11 shows a productivity vs energy consumption curve (curve 1) of a TSA process according to the embodiment of FIG. 2 comprising the sequence of steps (a), (a1), (a2), (b), (b1), (c), in comparison with the curve (curve 2) of a process comprising the sequence of steps (a), (a2), (b), (c).

As clearly visible from FIG. 11, the process according to FIG. 2 has much lower energy consumption and much higher productivity than a process comprising a preliminary heating step (a2), but not pre-heating (a1) and pre-cooling (b1) steps. The curves shown in FIG. 11 have been determined by considering the data points with purity equal to or higher than 96% and recovery equal to or higher than 90%.

The purity is also related to the time of the adsorption step (a). As it increases, the transition front through which $CO_2$ is adsorbed approaches the end of the reactor; the purity will increase because the reactor is increasingly loaded with $CO_2$ until the front eventually breaks through, at which point the recovery decreases rapidly. The increase in $CO_2$ loading within the reactor at the end of the adsorption step will also result in a lower specific energy consumption because the provided heat is more efficiently used (a larger fraction is consumed for the actual desorption of $CO_2$).

The above effect can be seen when comparing the outlet composition profile according to Runs 1 and 2 (FIG. 9), where the $CO_2$ front clearly breaks through earlier the reactor to a greater extent in the case of Run 2, whose adsorption step is longer.

However, the lower $CO_2$ recovery achieved in Run 2 is compensated by a higher purity and much lower energy consumption.

The increased $CO_2$ recovery achieved in Runs 1 and 3 is obtained by purging the reactor with the $N_2$-containing waste stream during the pre-cooling step (b1), wherein a further amount of $CO_2$ is desorbed meaning that less $CO_2$ is lost during the adsorption step (a).

Figure 12:
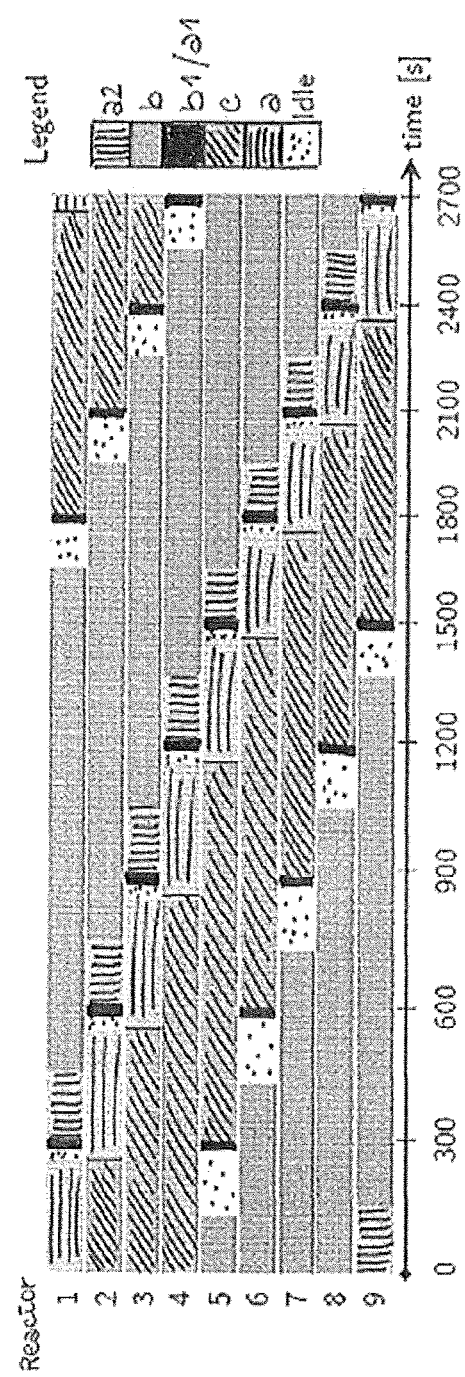
FIG. 12 shows a schedule for the operation of the process according to the second embodiment of the invention.

FIG. 12 shows a schedule for the operation of the process according to the second embodiment of the invention with the operating conditions corresponding to those of Run 1 (Table 1).

In order to ensure a continuous production and synchronous pre-heating (a1) and pre-cooling (b1) steps, an idle time of 150 seconds, splitted in two intervals of 130 seconds (before pre-cooling) and 20 seconds (before pre-heating), and 9 reactors are required, which are operated shifted in time by 300 s.

It is worth noting that there is a minimum number of reactors required to ensure given scheduling constraints, and that in general increasing the number of reactors decreases the idle times and vice versa.

What is claimed is:

1. A temperature swing adsorption process for removing a target component from a gaseous mixture containing at least one side component besides the target component, said process being carried out in a plurality of reactors, wherein each reactor performs the following steps:
   (a) an adsorption step, comprising contacting an input stream of said gaseous mixture with a solid adsorbent and adsorption of target component from said input stream, providing a target component-loaded adsorbent and a first waste stream depleted of the target component;
   (b) heating of said loaded adsorbent and desorption of a first amount of target component, providing a partially regenerated adsorbent and a first output stream containing the desorbed target component; and
   (c) cooling of said at least partially regenerated adsorbent, the process of each reactor being characterized by:
   a pre-cooling step before said cooling step, wherein said partially regenerated adsorbent is contacted with a waste stream depleted of the target component which is provided by at least one other reactor of said plurality of reactors while performing the adsorption step, wherein a second amount of target component is desorbed providing a second output stream containing the target component; and
   a pre-heating step after said adsorption step and before said heating step, wherein said loaded adsorbent is contacted with a rinse stream containing the target component which is provided by at least one other reactor of said plurality of reactors while performing the pre-cooling step, wherein an amount of target component contained in said rinse stream is adsorbed and a second waste stream depleted of the target component is produced,
   wherein a first reactor provides said waste stream for the pre-cooling step, and a second reactor provides said rinse stream for the pre-heating step.

2. The process according to claim 1, wherein said waste stream for the pre-cooling step is cooled prior to said pre-cooling step.

3. The process according to claim 1, wherein said rinse stream is heated prior to said pre-heating step.

4. The process according to claim 1, wherein the heating step comprises direct heat exchange with a heating medium in contact with the adsorbent.

5. The process according to claim 1, wherein the cooling step comprises direct heat exchange with a cooling medium in contact with the adsorbent.

6. The process according to claim 1, wherein the heating step and/or the cooling step comprises indirect heat exchange.

7. The process according to claim 6, wherein said heating step partially takes places during the pre-heating, and said cooling step partially takes places during the pre-cooling step.

8. The process according to claim 1, wherein said rinse stream is exchanged without an intermediate storage from said at least one other reactor undergoing the pre-cooling step to said reactor undergoing the adsorption step.

9. The process according to claim 1, wherein said rinse stream is exchanged with an intermediate storage in a suitable tank from said at least one other reactor undergoing the pre-cooling step to said reactor undergoing the adsorption step.

10. The process according to claim 1, each reactor of said plurality performing a preliminary heating step after said pre-heating step and before said heating step, wherein during said preliminary heating step a gaseous product containing said at least one side component is released from the adsorbent and is recycled to a reactor undergoing the adsorption step.

11. The process according to claim 10, wherein at least one of the following conditions applies:
the time duration of the preliminary heating step is from 3 to 10 times the time duration of the pre-heating step;
the time duration of the heating step is from 15 to 70 times the time duration of the pre-heating step; or
the time duration of the cooling step is from 10 to 50 times the time duration of the pre-cooling step.

12. The process according to claim 10, wherein said preliminary heating step is carried out at a temperature lower than the temperature of the subsequent heating step.

13. The process according to claim 1, wherein said solid adsorbent is suitable to selectively adsorb said target component over said at least one side component and over water.

14. The process according to claim 1, wherein said solid adsorbent comprises at least a first layer of a first material suitable for selectively adsorbing water and a second layer of a second material suitable for selectively adsorbing the target component, and the adsorption step comprising a first step of adsorption of water contained in the gaseous mixture, through said first layer, and a second step of adsorption of the target component, through said second layer.

15. The process according to claim 1, wherein the temperature of said heating step is not greater than 250° C.

16. The process according to claim 1, wherein the target component is carbon dioxide.

17. Use of the process according to claim 1 for treating a flue gas of an ammonia or methanol or urea plant.

18. A plant for treating a gaseous mixture and removing a target component from said gaseous mixture with a process according to claim 1, the plant comprising a plurality of reactors, each reactor containing an adsorbent bed for selectively adsorbing said target component, wherein:
each reactor operates by a sequence of steps comprising:
adsorption of the target component in the adsorbent bed, pre-heating and subsequent heating of loaded adsorbent for desorption of the target component, pre-cooling and subsequent cooling of the so obtained regenerated adsorbent,
and wherein the reactors are interconnected so that each reactor:
during the pre-cooling step, receives a waste stream depleted of the target component which is provided by at least one other reactor of said plurality of reactors while said at least one other reactor is performing the adsorption step; and
during the pre-heating step, receives a rinse stream containing the target component which is provided by at least one other reactor of said plurality of reactors while said at least one other reactor is performing the pre-cooling step.

19. The process according to claim 15, wherein the temperature of said heating step is not greater than 200° C.

20. The process according to claim 15, wherein the temperature of said heating step is not greater than 170° C.

21. The process according to claim 4, wherein said heating medium being a stream containing predominantly the target component.

22. The process according to claim 5, wherein said cooling medium being a target component depleted-waste stream.

23. The process according to claim 11, wherein the time duration of the preliminary heating step is six times the duration of said pre-heating step.

\* \* \* \* \*